(12) United States Patent
Bullock

(10) Patent No.: US 7,322,781 B2
(45) Date of Patent: Jan. 29, 2008

(54) ADJUSTABLE LOAD STABILIZER METHOD AND APPARATUS

(76) Inventor: Matthew Bullock, 4509 N. 7th St., Arlington, VA (US) 22203

( * ) Notice: Subject to any disclaimer, the term of this patent is extended or adjusted under 35 U.S.C. 154(b) by 0 days.

(21) Appl. No.: 11/127,193

(22) Filed: May 12, 2005

(65) Prior Publication Data

US 2006/0257226 A1  Nov. 16, 2006

(51) Int. Cl.
*B60P 7/08* (2006.01)
(52) U.S. Cl. ............. 410/123; 410/128; 410/151; 410/154; 410/155
(58) Field of Classification Search ........ 410/122–124, 410/127, 128, 151, 154, 155; 248/354.3, 248/354.4, 354.6; 211/105.4; 114/75
See application file for complete search history.

(56) References Cited

U.S. PATENT DOCUMENTS

| | | | |
|---|---|---|---|
| 2,199,851 A | * | 5/1940 | Culver |
| 3,612,463 A | | 10/1971 | Grant |
| 4,553,888 A | | 11/1985 | Crissy et al. |
| 4,815,905 A | * | 3/1989 | Garcia, Jr. ............. 410/128 |
| 5,037,256 A | | 8/1991 | Schroeder |
| 5,062,751 A | | 11/1991 | Liebel |
| 5,132,156 A | | 7/1992 | Trassare, Jr. et al. |
| 5,139,842 A | | 8/1992 | Sewell |
| 5,484,643 A | | 1/1996 | Wise et al. |
| 5,846,038 A | | 12/1998 | Bostelman |
| 5,855,459 A | | 1/1999 | Krier et al. |
| 5,947,666 A | | 9/1999 | Huang |
| 6,419,434 B1 | | 7/2002 | Rahn |
| 6,435,787 B1 | | 8/2002 | John |
| 6,527,488 B2 | | 3/2003 | Elze et al. |
| 6,533,513 B2 | | 3/2003 | Kanczuzewski et al. |
| 6,568,636 B2 | | 5/2003 | Fitzgerald |

* cited by examiner

*Primary Examiner*—Stephen Gordon
(74) *Attorney, Agent, or Firm*—Bradford Kile; Scott Houtteman; Kile Goekjian Reed & McManus

(57) ABSTRACT

The present invention is directed to an apparatus and method for stabilizing cargo within a transport container. An apparatus includes first and second tubular elements having generally cylindrical bodies and bases at one end which can react against opposing surfaces within the transport container and stabilize cargo within the container. One base of one tubular member can react against a surface of cargo and the other base of the other tubular member can react against an opposing surface of other cargo or an internal wall of the transport container. An extension mechanism allows for the extension and selective translation between the first and second tubular members allowing the apparatus to extend and fill the space between opposing surfaces within the transport container and stabilize the cargo. A method for stabilizing cargo within a transport container includes providing an extensible load stabilizer having first and second tubular elements, each having a base, positioning the load stabilizer between opposing surfaces within the transport container, and extending the tubular members with respect to each other, and stabilizing a surface of cargo against an opposing surface.

4 Claims, 9 Drawing Sheets

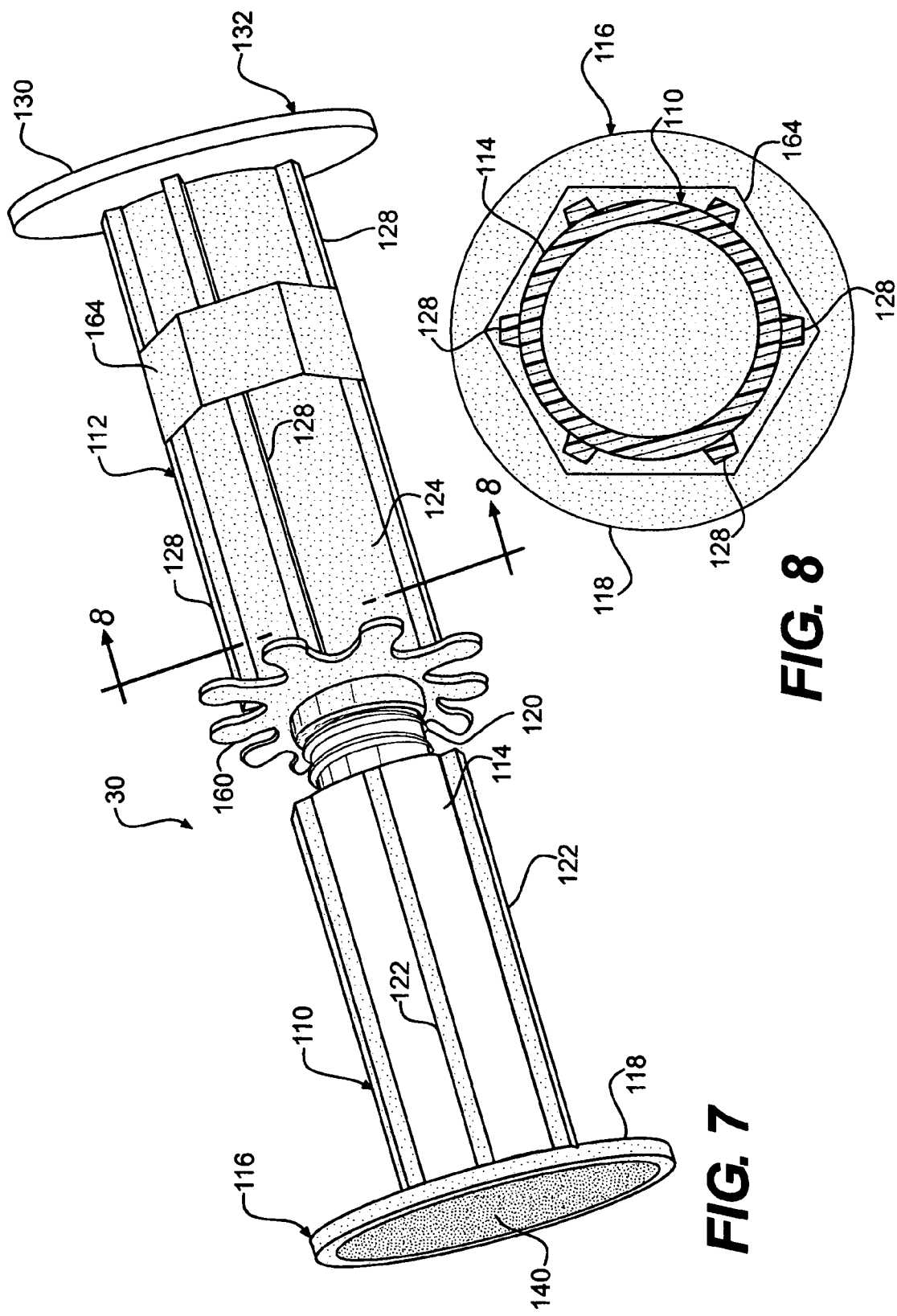

ADJUSTABLE LOAD STABILIZER METHOD AND APPARATUS

RELATED PATENTS

This application relates to U.S. Pat. No. 6,089,802 entitled "Cargo Restraint System for a Transport Container" issued on Jul. 18, 2000, U.S. Pat. No. 6,227,779 entitled "Cargo Restraint Method for a Transport Container" issued on May 8, 2001, and U.S. Pat. No. 6,607,337 entitled "Cargo Restraint System" issued on Aug. 19, 2003, all of common inventorship and assignment as the subject application.

BACKGROUND OF THE INVENTION

This invention relates to an improved method and apparatus for stabilizing cargo during transportation. More particularly, this invention relates to a novel method and apparatus for stabilizing and restraining undesired movement of drums, boxes, rigid and flexible containers, palletized or not palletized, within the interior of a transport container or the like with respect to each other and/or with respect to the internal walls of the container.

Most shipments for transport are placed in enclosures such as ship cargo holds, intermodal containers, truck trailers, truck bodies, railroad box cars, and the like. Examples of cargo in containment enclosures include fifty five gallon closed head drums, super sacks or plastic reinforced bags, plastic wrapped bundles, cased goods, metal coils, specialty heavy paper rolls, plastic or metal containers mounted on pallets, etc. Although each individual component of cargo may be quite heavy and stationary at rest, the mass of a transport load can produce considerable momentum force as a ship, railroad car, truck trailer or truck body is placed in motion, stops, or changes direction.

During ocean shipping, cargo within cargo holds or intermodal containers are subjected to wave forces including: yaw, pitch, heave, sway, and surge. Depending upon weather conditions and the size of the vessel, cargo can experience various magnitudes of shifting forces throughout the course of a transoceanic voyage.

In another transport context, railroad trains are made-up by individual box cars being rolled together in a switching yard. When a railroad car is rolled into a stationary string of cars, the impact causes the car couplings to lock together with a jolt. This impact can apply a significant force to cargo within the rail car. Moreover, during transport, railroad cars and overland transport vehicles are subject to braking forces, bumps, centrifugal forces on curves, vibration, dips in the track or road, swaying, run-in or run-out forces, etc.

Each of these forces has the potential to impart a substantial force to cargo during transport. When cargo contacts other cargo or the interior walls or doors of a container, the force necessary to reduce its momentum to zero must be absorbed by the goods and/or the container. Such forces can result in damage to the cargo, damage to the interior walls or doors of the container, damage to the cargo packaging, and may even create dangerous leaks if the cargo is a hazardous material. Accordingly, it is undesirable to permit cargo to gain any momentum independent of other cargo or a transport container. This can be accomplished by stabilizing the cargo within the container with respect to other cargo and/or the internal walls of the container so that the cargo and container are essentially united and operationally function as a single object during transport.

In order to stabilize cargo with respect to other cargo and the internal walls of a transport container or cargo hold, various forms of load containments, load spacers and void fillers have been used to fill the spaces between cargo and between cargo and the internal walls of a container, box car or cargo hold. Often, load containment enclosures are secured to the floor or sides of the transport container and prevented from moving with respect to each other by specially fabricated wood or steel framing, floor blocking, rubber mats, steel strapping, or heavy air bags. A variety of dunnage materials and void fillers has been used to prevent the movement of cargo with respect to other cargo and the internal walls of the transport container. Each of these previously known systems has limitations associated with cost, lack of strength, amount of labor required for installation, time expended for installation, lack of flexibility and securement integrity.

Further to the above, in the past, various dunnage materials have been utilized within transport containers to eliminate unwanted movement or shifting of a load. Drums, boxes, or other containers have been restrained in several different ways. Primarily, cargo has been stabilized by the use of void fillers such as collapsible cardboard frames or cells. These systems use strips of corrugated cardboard configured and assembled to expand into solid rectangular frames or cells of various forms and sizes and incorporate honeycomb and/or diamond-shaped cells for space and strength considerations. These systems while useful for known rectangular voids can exhibit impaired performance due to size and/or dimension variance. Moreover curved surfaces can not be accommodated well with rectangular shaped void fillers. The difficulty in applying various rectangular units to irregular shapes and the on site adjustment for varying sizes of voids to be filled, the unsuitability of corrugated board to absorb strong compression forces, and the use of materials not fully resistant to moisture can impair use of this type of dunnage void filler system.

Other known means of restraint such as the use of inflatable dunnage bags used alone or in combination with collapsible void fillers have tended to exhibit the disadvantage that air bags are subject to rupturing, leakage and loss of air pressure, or simply contraction and securement loosening in low temperature environments.

In addition to the above, other restraining systems known in the past often required additional elements and equipment which tended to be cumbersome to store, arduous to handle and/or install, and often required a degree of skilled labor in application.

Finally, in certain instances wood block and bracing has been used in the past to fill voids and secure loads; however, wood bracing is somewhat time consuming to install and often requires skilled or semi-skilled labor which is often contracted out to third parties. In addition certain wood materials are not suitable for international transport without fumigation which increases the overall cost of the securement system.

Consequently, a need exists for securing cargo in cargo holds, transport containers, box cars, truck trailers and the like that is functionally effective, cost-efficient, and labor-efficient. Still further a need exists for load stabilization systems that have enhanced strength characteristics under a variety of environments, exhibit flexibility for loads of various types and sizes and limit cargo shifting within a container.

The problems suggested in the preceding are not intended to be exhaustive but rather are among many which may tend to reduce the effectiveness of load stabilizer methods and apparatus appearing in the past. Other noteworthy problems may also exist; however, those presented above should be sufficient to demonstrate that load stabilizing systems appearing in the past will admit to worthwhile improvement.

OBJECTS AND SUMMARY OF THE INVENTION

Objects

It is a general object of the subject invention to provide a novel method and apparatus to stabilize cargo within a ship hold, transport container, box car, truck trailer, and the like which will obviate or minimize problems and concomitantly achieve at least some of the desired aspects of cargo stabilization of the type previously described.

It is another general object of the subject invention to judiciously protect cargo from damage during transport and to provide enhanced stabilization of cargo within a ship hold, transport container, box car, truck trailer, and the like by minimizing shifting of cargo during transport.

It is a specific object of the invention to provide a stabilization method and apparatus for a transport container, and the like, with enhanced strength to stabilize cargo against transport forces such as swaying, lateral shifting and other forms of shifting of cargo within a ship hold, transport container, box car, truck trailer, and the like.

It is a related object of the invention to provide a stabilization method and apparatus for a transport container, and the like, where the amount of cargo shifting for a given level of impact is minimized.

It is another object of the subject invention to reduce the equipment, material and labor costs involved in stabilizing cargo against unwanted motion within a transport container, and the like.

It is a particular object of the subject invention to provide a method and apparatus for securing cargo that is self-contained and may be installed quickly, reliably, and efficiently by relatively unskilled labor, in a variety of ship holds, transport containers, box cars, truck trailers, and the like.

It is another object of the subject invention to provide for efficient and simple removal of the stabilization system from a transport container, or the like, at a cargo destination for discard or reuse.

It is still a further object of the subject invention to provide a method and system for filling voids and keeping cargo separated and secure that is able to withstand a wide range of compression forces, temperatures, and levels of humidity to operate effectively in a wide range of ambient environments.

BRIEF SUMMARY OF THE INVENTION

One preferred embodiment of the invention, which is intended to accomplish at least some of the foregoing objects, comprises a method and apparatus for stabilizing cargo within a ship hold, transport container, box car, truck trailer, and the like with respect to other cargo and the internal walls of the container by the selective application of mutually extendible void filler cylinders. More specifically, stabilization is achieved by application of pairs of tubular members, which are extensible with respect to each other. Each tubular member is coupled to a base which is designed to abut directly or indirectly against a face of cargo or an internal wall of a transport container. Securement is achieved by extending the two tubular members with respect to each other to fill in a void between the face of opposing cargo surfaces or an internal wall of a container, or the like.

THE DRAWINGS

Other objects and advantages of the present invention will become apparent from the following detailed description of preferred embodiments taken in conjunction with the accompanying drawings wherein:

FIG. 7 is an axonometric view of an alternative preferred embodiment of the subject void filler invention where enlarged end flanges are designed to abut directly against cargo to be stabilized or a container wall surface;

FIG. 8 is a cross sectional view taken along section line 8-8 in FIG. 7;

DETAILED DESCRIPTION

Context of the Invention

Figure 1:
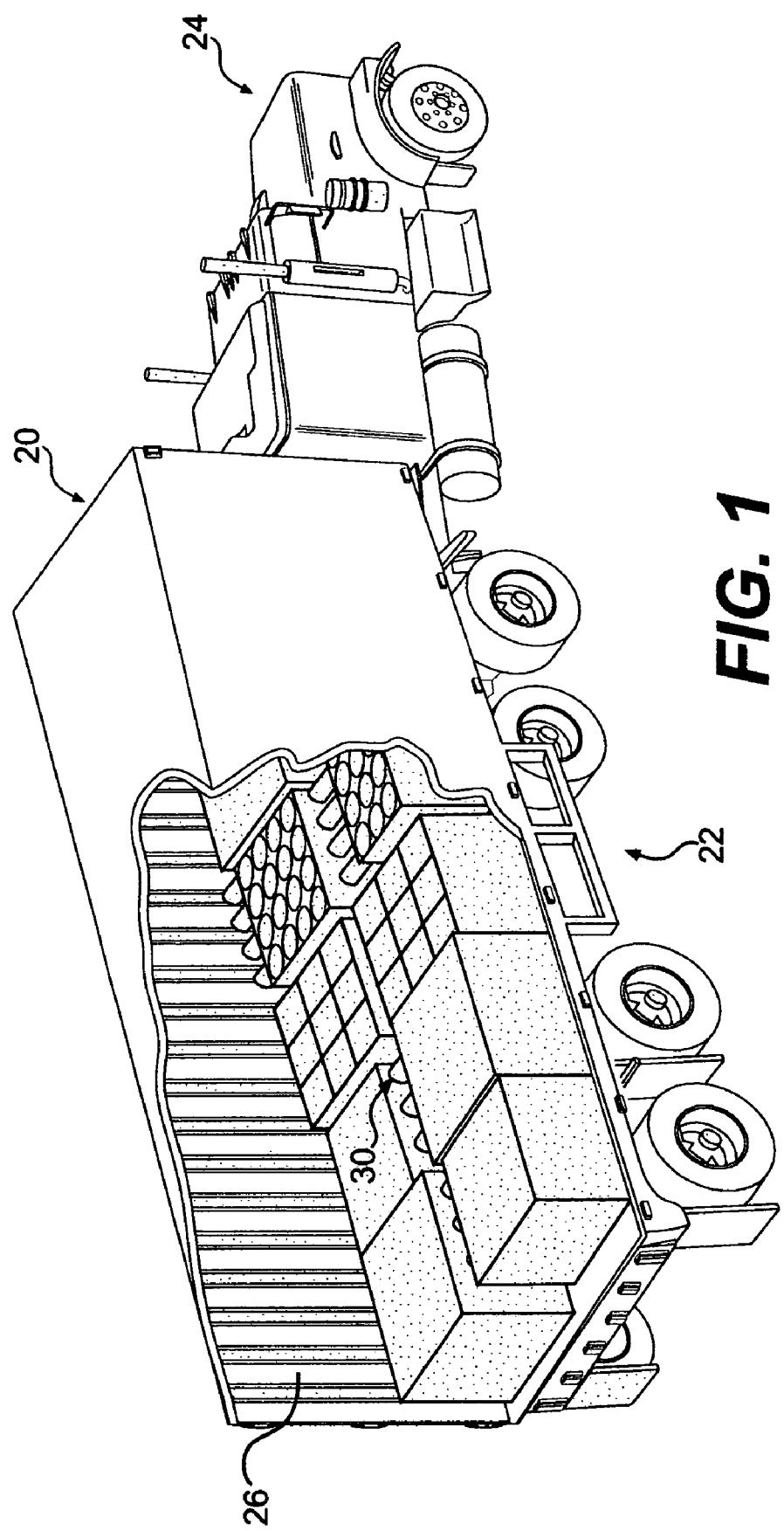
FIG. 1 is an axonometric view showing the interior of a transport container secured to a flatbed of a truck or truck trailer, with cargo stabilized within the container in accordance with the subject invention.

Turning now to the drawing wherein like numerals indicate like parts, FIG. 1 shows an axonometric view of an operating environment of the invention. In this, a transport or cargo container 20 is shown mounted upon a trailer 22 which is towed by a tractor 24 for land transport. Containers such as these are also operable to be mounted on railway flat cars either directly or attached to trailers 22. This form of container is merely illustrative and the subject invention can be used to advantage in ship cargo holds, intermodal containers, tractor trailers, overland truck bodies, rail road boxcars, and the like.

A partially cut away portion of FIG. 1 depicts various size and shapes of cargo, which are stabilized against each other and against the internal walls 26 of the container 20 by load stabilizers 30 in accordance with the subject invention.

Figure 2:
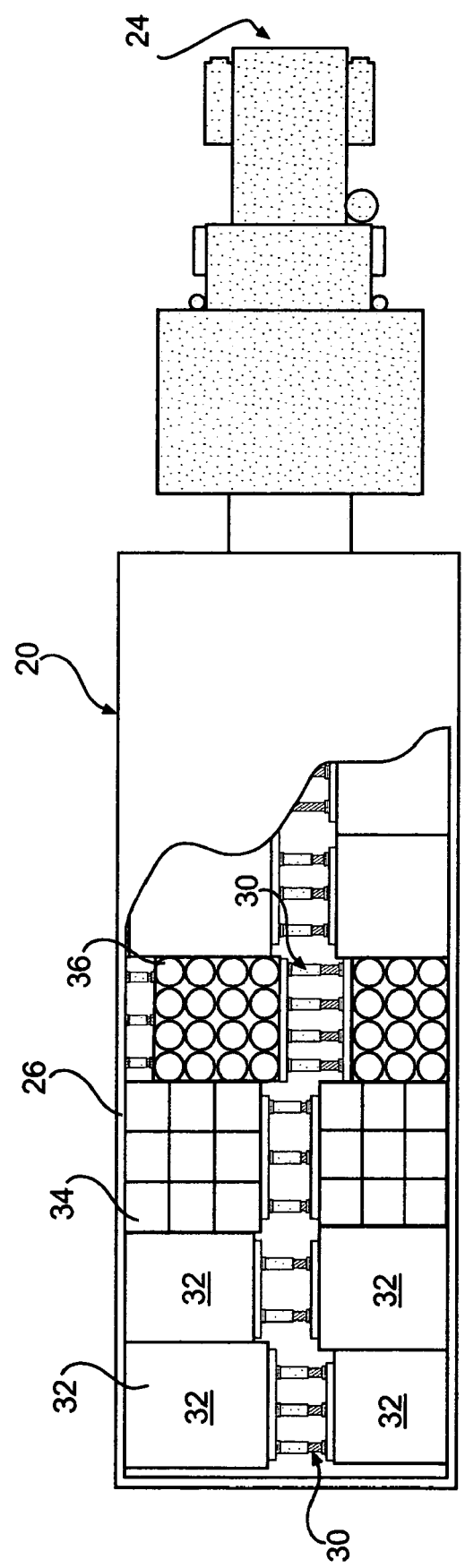
FIG. 2 is a top view showing the interior of a transport container such as a truck trailer or the like where a plurality of void filler stabilizers, in accordance with the invention, are shown occupying different dimensional spaces.

FIG. 2 further illustrates details of the illustrative operating environment shown in FIG. 1. In this view, transport or cargo container 20 is again shown towed by a tractor 24 for land transport. A partially cut away portion of FIG. 2 depicts cargo including various sizes of large boxes or super sacks 32, smaller boxes on pallets 34 and drums 36, all being stabilized against each other and/or against the internal walls 26 of the container 20 by a plurality of void fillers and load stabilizers 30 in accordance with the subject invention.

Void Filler and Load Stabilizer

Figure 3:
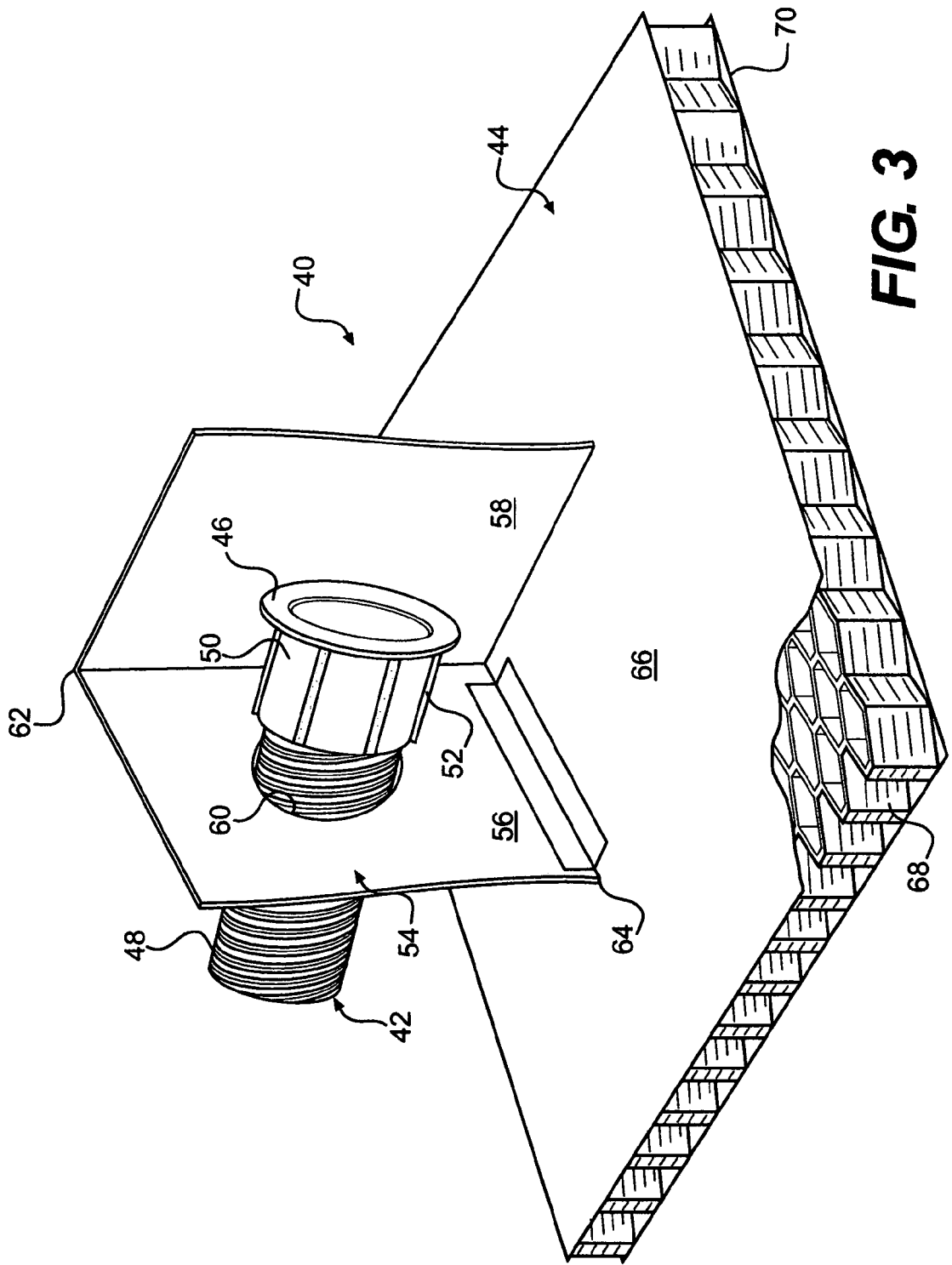
FIG. 3 is a pictorial view of the present invention showing a first tubular, male, element of one preferred embodiment of the subject invention.

FIG. 3 is an axonometric view of a male portion 40 of one embodiment of the present void filler invention 30 showing a male tubular element 42 and a composite base. More particularly, the first or male tubular member 42 of a void filler column mechanism is shown having an abutment flange 46 at one end and external threads 48 at the other end. The tubular member 42 has an enlarged peripheral collar 50 adjacent to the flange 46 with a roughened exterior peripheral surface formed by knurling or the like or the addition of one or more longitudinally extending raised spines or ribs 52 extending along the collar 50 to facilitate grip for rotation of the tubular element 42 with respect to the base as will be discussed below. Creation of one or more ribs or spines 52 also serves as a stiffening structural element to prevent bending of the column 42 and strengthening of the junction of the column and the flange 46 against flexure or breakage. In those circumstances where hand tightening is not sufficient for the cargo to be secured a conventional belt wrench may be wrapped around and engage the roughened surface or raised ridges 52 of collar 50. Moreover, the belt of the belt wrench may be fabricated with roughened interior surfaces to correspond to surface 50 to facilitate gripping without slippage. Alternatively, collar 50 may have an area that is molded to fit a standard hexagonal wrench for tensioning as shown in FIG. 7.

The first tubular element 42 is connected to a load distribution base panel 44 through a set 54 of foldable engagement panels 56 and 58. One panel 56 of the set of foldable panels 54 has an aperture 60 that serves to locate and support the first tubular element 42. The second engagement panel 58 serves as a load distributing abutment element for the flange 46 to distribute axial loading of the tubular member 42 onto the base panel 44. The engagement panels 56 and 58 are preferably hinged along a center fold or ridge 62 and one of the panels is in turn pivotally hinged as at 64 to an outer surface 66 of the load distribution panel 44.

The load distribution base panel 44 is composed of outer surface 66 composed of a heavy grade paper or plastic sheeting and is glued to an array of vertical honey comb columns 68. An outer surface of the honey comb columns 68 is covered by another layer of paper or plastic sheeting 70 or the like to provide a light weight but structurally rigid and strong base panel 44 to distribute loading across a cargo surface and an axially adjustable column 42 of the subject void filler system. In an alternative embodiment, load distribution panel 44 may be composed of a double wall corrugated cardboard.

Figure 4:
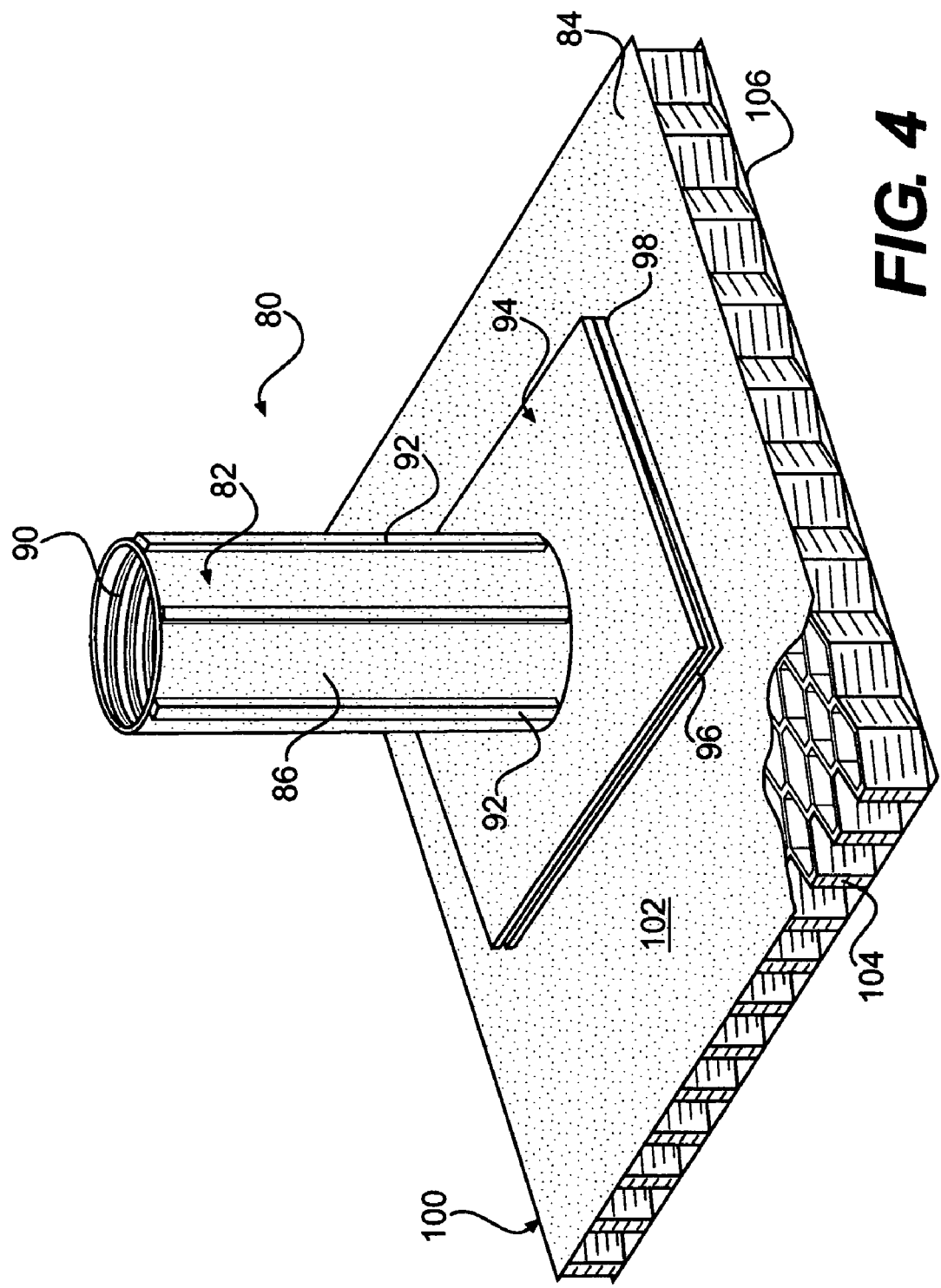
FIG. 4 is a pictorial view of the present invention showing a second tubular, female, element of the embodiment of the invention depicted in FIG. 3.

Turning now to FIG. 4 there will be seen a void filler element 80 which is a female counterpart to the male void filler element 40 as discussed in connection with FIG. 3 above. More specifically, FIG. 4 discloses a second tubular member 82 and a composite base 84. The second tubular member 82 has a cylindrical body component 86 with a flange 88 at one end (note FIG. 5) and internal thread elements 90, which are designed and dimensioned to cooperate with external threads 48 of the first tubular member 42.

The cylindrical body component 86 can have a smooth outer surface or more preferably an outer surface that is roughened as by a furling procedure to facilitate gripping. In addition, in instances of rugged application the outer surface is fashioned with one or more longitudinally extending ridges 92 that enhance the structural rigidity of the second columnar member 82 against bending. Moreover the ridges 92 are integrally joined with the flange 88 to help to support and secure the flange against bending under axial loading of the tubular member 82.

In operation, (note again FIG. 3) the first tubular member 42 is fitted into the set of foldable panels 56 and 58 such that the flange 46 is located between the two panels 56 and 58 of the set 54 and rotation of the tubular member 42 relative to the base panel 44 is permitted. Once the tubular member 42 is placed into the set 54 of foldable panel wings 56 and 58, the set of foldable panels 54 is collapsed onto base panel 44 in a structural manner similar to that shown in FIG. 4. In a similar manner the second tubular member 82 is secured between a set 94 of panels 96 and 98 of the composite base 84.

The flange 88, in one embodiment, is secured within the set 94 of foldable engagement panels 96 and 98 in a manner discussed above and in connection with panels 56 and 58. The panel 98 abuts against a load distribution panel 100 having an outer surface 102 composed of paper or plastic, interior honey comb columns 104 and an outer skin 106. The load distribution panel comprises a honey comb composite that is both strong and light weight. In an alternative embodiment, load distribution panel 44 may be composed of a double wall corrugated cardboard.

The tubular members 42 and 82 are fashioned to be light-weight but concomitantly strong and crush-resistant. In this, the columns 42 and 82 can be fabricated from acrylonitrile butadiene styrene ("ABS") thermoplastic. ABS has good strength and is resilient in a broad range of temperatures and environments. Alternatively, the tubular members 42 and 82 can be made from polyvinyl chloride ("PVC") pipe, polypropylene, or high density polyethylene. Preferably, the tubular members 42 and 82 are approximately twelve inches in length and three inches in diameter, having walls of three sixteenths inch in thickness. However, other lengths, diameters, and thicknesses may be substituted depending on the size of the cargo and the space between cargo components sought to be stabilized.

The external threads 48 of the male tubular element 42 shown in FIG. 3 and the internal threads 90 of the corresponding female tubular member 82 shown in FIG. 4 are preferably rugged and extend along the tubular members 42 and 82 for approximately three or more inches. However, the thread may be of another size and may extend along other than a three-inch length along the tubular members 42 and 82, for example by extending throughout the entire length of the tubular members 42 and 82.

Figure 6:
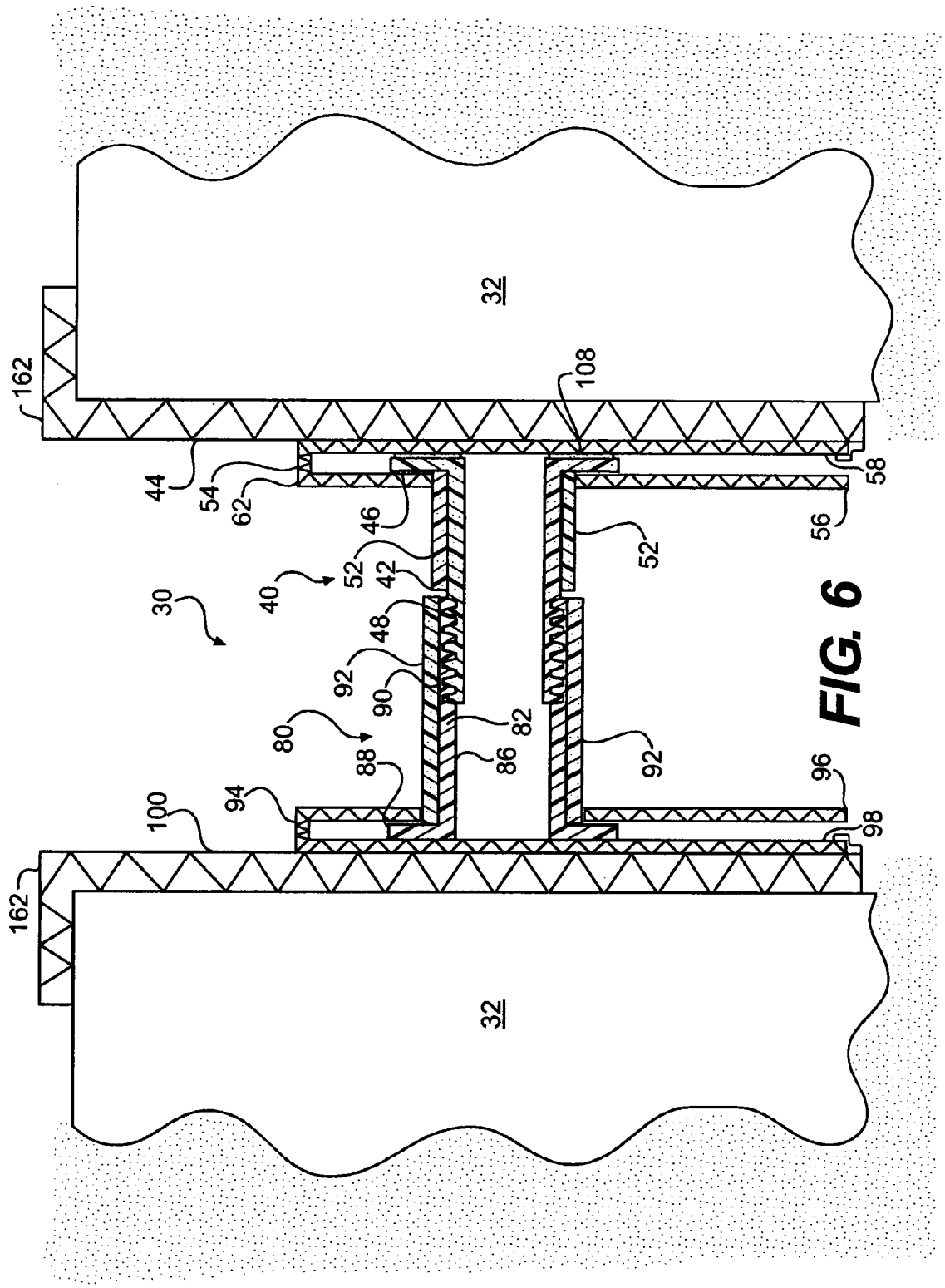
FIG. 6 is a cross sectional view of the present invention showing each of two tubular elements and their respective bases after engagement, in situ, between two opposing load faces.

In FIG. 3 and FIG. 4, the sets of foldable wings 54 and 94 and the flanges 46 and 88 serve to rotatably mount the first tubular member 42 and second tubular member 82 on their respective composite load distribution panels 44 and 100. Other methods to couple the first tubular member 42 and second tubular member 82 to a load distribution base 44 and 100 are contemplated. The tubular members 42 and 82 may be rotatably coupled to the base 44 and 100 or coupled in such a way that one is fixed to one of the bases as by application of a layer of adhesive 108 as illustrated in FIG. 6. In an alternative embodiment only one of tubular members 42 or 82 are rotatably coupled to their respective bases. In still a further embodiment, the bases 44 and 100 may be discrete structures and may be pre-attached to the cargo to be stabilized by an adhesive or the like.

Figure 5:
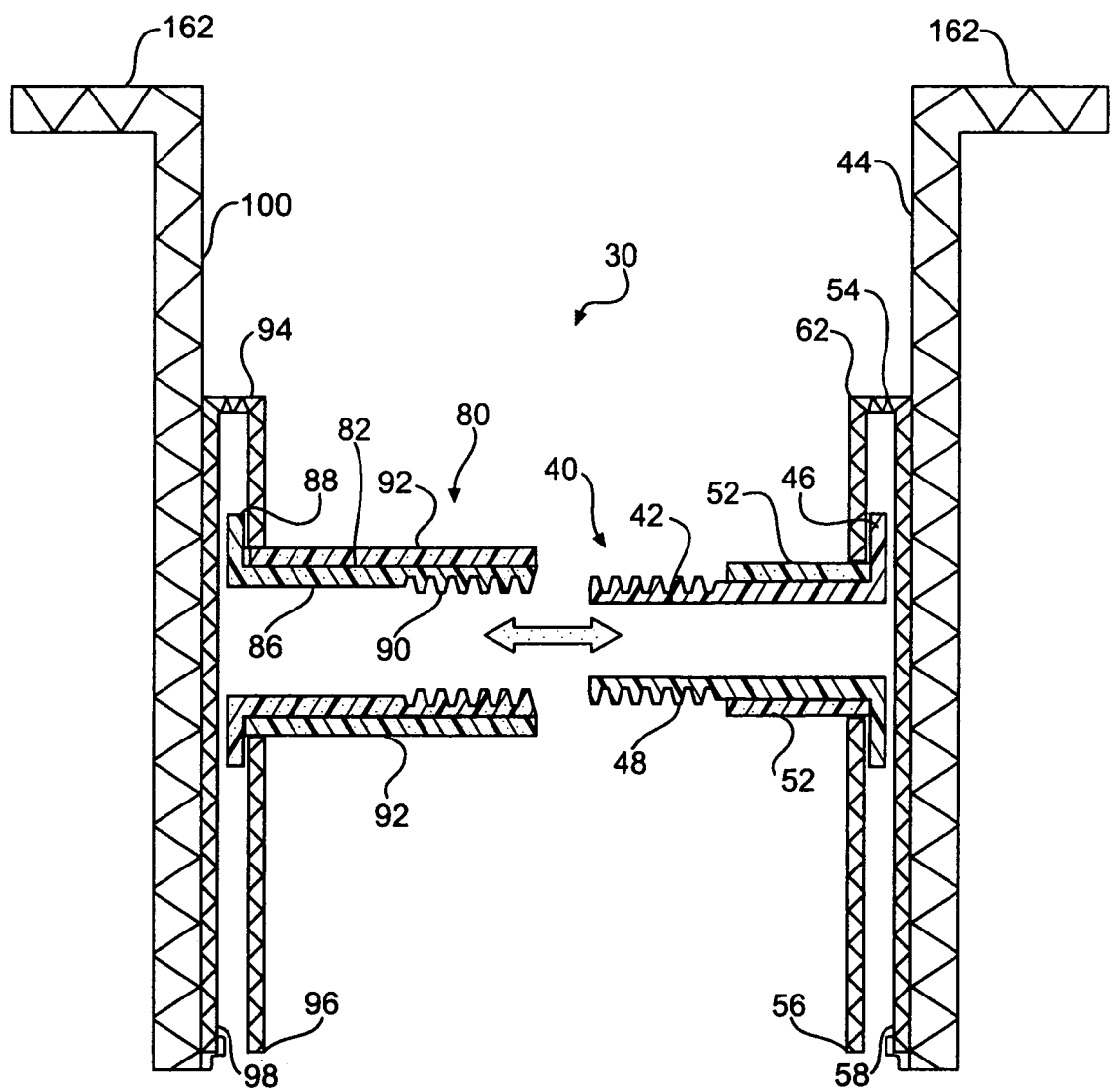
FIG. 5 is a cross sectional view of the present invention showing the first and second tubular elements and their respective base elements prior to mutual engagement.

FIG. 5 is a cross-sectional view of the various elements of the present invention showing a load stabilizer 30 comprising a male void filler element 40 and a female void filler element 80. A first tubular member 42 and a second tubular member 82 are shown, each having a flange 46 and 88, which is held between a set of foldable wings 54 and 94 and onto a base 44 and 100 respectively. The first tubular member 42 has external threads 48, which are operable to engage internal threads 90 of the second tubular member 82. The tubular member 42 has a plurality of longitudinally extending raised spines or ribs 52 to facilitate grip for rotation of the tubular element 42 and for strength as discussed above. The second tubular member 82 similarly has a plurality of longitudinally extending ridges 92 which facilitate grip and strength of the component 82. In the depicted embodiment, a set of wings 162 is further shown to maintain the vertical position of the load stabilizer 30 with respect to cargo.

FIG. 6 is a view similar to FIG. 5; however, in this view the void filler is shown operably positioned between opposing surfaces of cargo components 32. The male and female components 40 and 80 are turned together and create a variable length compression column between the cargo surfaces 32.

The first tubular member 42 and second tubular member 82 are mutually extensible with respect to each other upon rotation of one tubular member with respect to the other. The extension mechanism shown in FIGS. 3-6 comprise threads 48 on the first tubular member 42, which engage with compatible internal threads 90 on the second tubular member 82 such that the tubular members are selectively extensible with respect to each other upon the rotation of one with respect to the other. Although threaded elements are preferred other extension mechanisms are contemplated such as a plurality of radial holes within both columns and a pin extending through aligned holes. Alternatively, a ratched mechanism may be used between the columnar members; however, threads are preferred. In addition, a locking washer 160, as shown in FIG. 7, can be used to prevent the tubular members from becoming loose once extended. Alternatively, it is envisioned that other means may be employed for securing the axial position of the tubular members between a cargo surface and an opposing cargo surface or wall of a container to maintain the cylinder in an extended and secure position. As an example, tape or other retaining means such as an axial pin extending between the two columns may be employed to prevent counter rotation of the void filler after the axial position of the columns is extended and snuggly set between cargo surfaces or between cargo and a side wall of a container. This securing or locking element may take various other forms and the intent of this disclosure is to include all of the various extension mechanisms and locking mechanisms that may be used to lock the columns together.

One of skill in the art will see that other methods for extending and locking the extension of the first and second tubular members 42 and 82 with respect to each other can be used and will all fall within the purview of the subject invention.

In FIG. 6 each of the first tubular member 42 and second tubular member 82 has a flange 46 and 88 folded into a set of foldable wings 54 and 92 and held onto a load distribution panel 54 and 98. As noted the load stabilizer 30 is extensible to fill the space between loads of cargo 32 by rotating one of the tubular members 42 or 82 with respect to the other to prevent the shifting of one load of cargo 32 with respect to the other 32. In the depicted embodiment, a set of wings 162 is further shown to maintain the vertical position of the load stabilizer 30 with respect to the cargo 32.

Although FIG. 6 illustrates the use of a load stabilizer between two loads of cargo 32. In an alternative use of the invention, the load stabilizer 30 can be placed between cargo 32 and an internal wall of a transport container. At least one base element of the load stabilizer, however, is in contact with cargo to be stabilized.

FIG. 7 is an axonometric view of an alternative preferred embodiment of the subject invention where enlarged end flanges act as bases, which are designed to abut directly with cargo to be stabilized. FIG. 7 illustrates the various elements of the present invention showing a load stabilizer 30 comprising a male void filler element 110 and a female void filler element 112. The male void filler element 110 comprises a first tubular member 114 and a base 116 in the form of an enlarged flange 118. The first tubular member 114 has external threads 120 and a plurality of longitudinally extending raised spines or ribs 122 to facilitate grip for rotation of the tubular element 110 relative to the female tubular element 112.

The second tubular member 112 comprises a cylindrical body 124 having internal threads 126 (note FIG. 10), which are operable to engage the external threads 120 of the first tubular member 110. The second tubular member 112 similarly has a plurality of longitudinally extending raised ridges 128 to facilitate rotation and provide strength for the column and an extra attachment for an enlarged flange 130 comprising a base 132 of the female component 112. The embodiment depicted further includes an area 164 that is molded to fit a standard hexagonal wrench for tensioning.

In the embodiment depicted in FIG. 7, the load void filler and stabilizer comprises a set of void filler elements 110 and 112, which comprise tubular elements 114 and 124 and a base 116 and 132 in the form of a flanges 118 and 130, respectively. In the embodiment depicted, the void filler element 30 further has an adhesive element 140 applied to an outer surface of the flange 118. This adhesive carries a release paper, not shown, which is removed on site and serves to locate and prevent rotation of one end of the void filler as it is being applied as will be discussed below.

The enlarged flanges 118 and 130 serve to react against a load of cargo to be stabilized and another load of cargo to be stabilized or an internal wall of a transport container. The adhesive element 140 serves to adhere the flange 118 to a load of cargo to be stabilized or an internal wall of a transport container to prevent rotation of the male void filler element 110 during application. Void filler element 112 can then be rotated with respect to male void filler element 110 to allow for the extension of the load stabilizer 30 to fill the space between a load of cargo to be stabilized and another load of cargo or an internal wall of a transport container.

FIG. 8 is a cross-sectional view of the present embodiment of the invention as shown in FIG. 7. This cross-sectional view illustrates the female tubular member 112 in cross-section with strengthening ribs 128 shown positioned about the periphery of the tubular element 124. The ribs 128 not only provide bending rigidity to the tubular column and an element of grip for rotation but also provide abutting support for the load bearing flange 130 extending radially away from the column 124.

Figure 9:
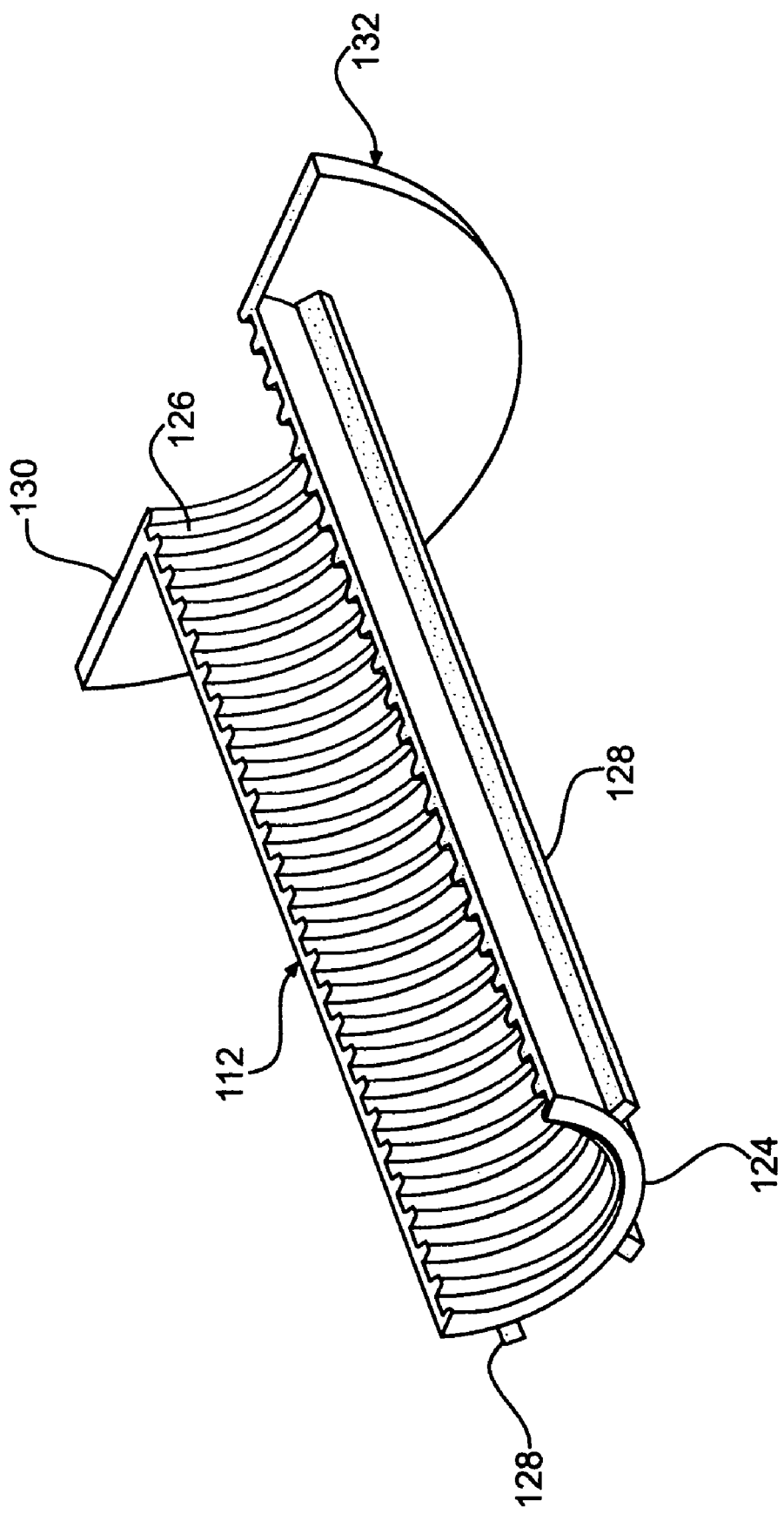
FIG. 9 is a cut-away axonometric view of a female component of the void filler depicted in FIG. 7.

FIG. 9 is a partial axonometric view of a female component 112 of the void filler depicted in FIG. 7. FIG. 9 shows the interior surfaces of a female void filler element 112 having a cylindrical body component 124 and a flange 130 comprising a base 132. The second tubular member 112 has internal threads 126. As described above, the internal threads 126 serve to engage with the external threads 120 of the corresponding first male tubular member 110 as shown in FIG. 7. The second tubular member 112 has a plurality of longitudinally extending raised ridges 128 to facilitate rotation.

Figures 10, 11:
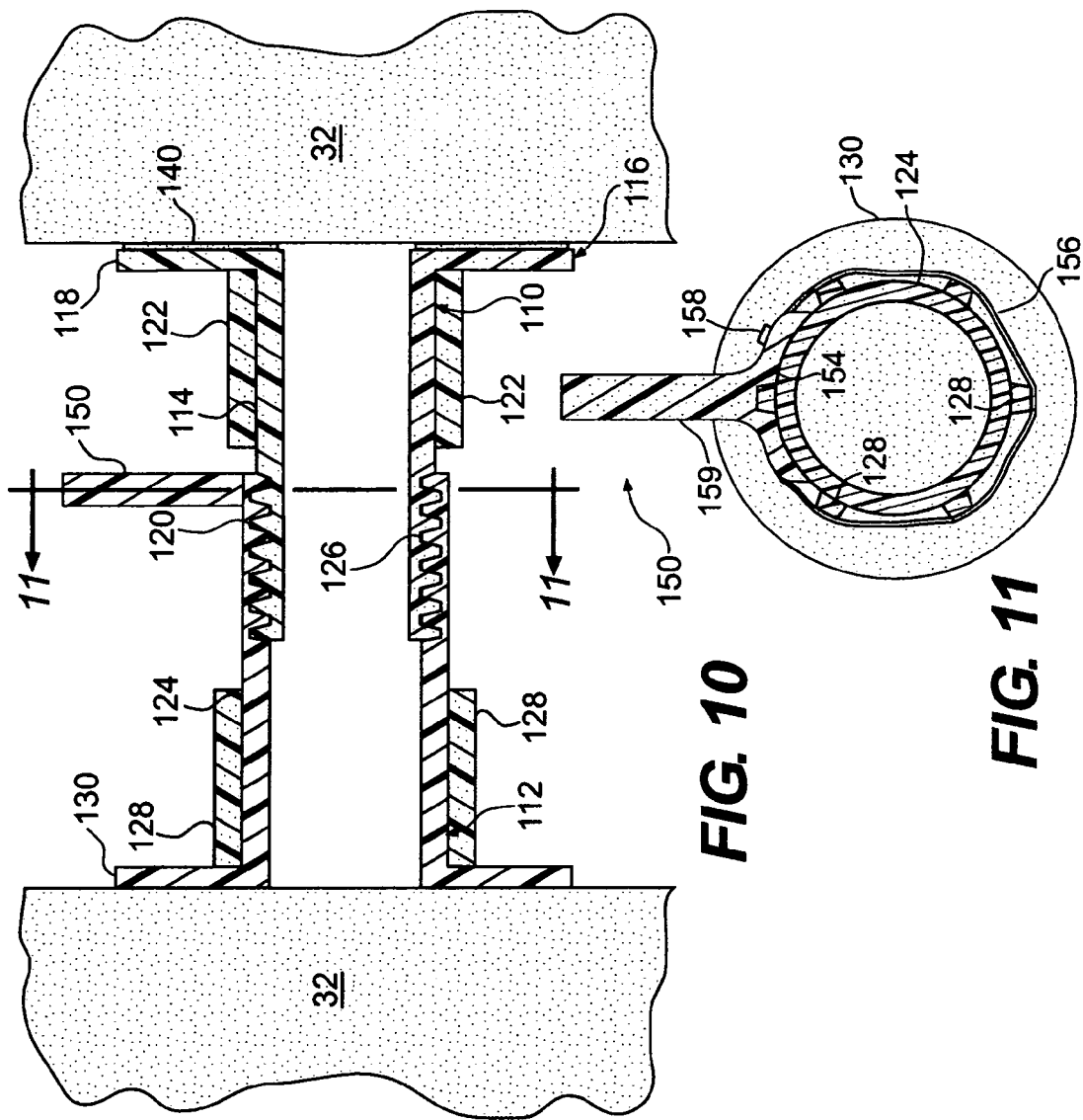
FIG. 10 is side cross-sectional view of a void filler as disclosed in FIGS. 7-9 including a torque tensioning member integral with a female component of the void filler device.
FIG. 11 is a cross-sectional view of the tubular torque element of the void filler disclosed in FIG. 10.

FIG. 10 is a side cross-sectional view of a void filler as disclosed in FIGS. 7-9 positioned between two loads of cargo 32. FIG. 10 shows the engagement of a male void filler element 110 and a female void filler element 112 into a load stabilizer 30. The male void filler element 110 has a first tubular member 114 and a base 116 in the form of a flange 118. The first tubular member 114 has a set of external threads 120 and a plurality of longitudinal extending raised spines or ribs 122. The second or female tubular member 112 has a set of internal threads 126 operable to engage the external threads 120 and a plurality of longitudinally extending raised strengthening ridges 128. In the depicted embodiment, the second tubular member 112 further has a torque tensioning member 150 connected to the exterior surface of the cylinder 124.

In the depicted embodiment, the flanges 118 and 130 serve to react against loads of cargo 32 to be stabilized. An adhesive element 140 serves to adhere the flange 118 to the load of cargo 32 to prevent rotation of the void filler element 110 with respect to the cargo 32. Void filler element 112 can then be rotated with respect to void filler element 40 to allow for the extension of the load stabilizer 30 to fill the space between two loads of cargo to be stabilized 32. A torque tensioning member 150 is optionally used to facilitate rotation of the void filer element 112 with respect to void filler element 110.

FIG. 11 is a front cross-sectional view of a tubular element 124 of the void filler 112 disclosed in FIG. 10. FIG. 11 illustrates a second female tubular element 112 with a cylindrical body component 124, a flange 130, and an optional torque tensioning member 150 as described above. In this, the tensioning member 150 includes a radially extending handle 159 which is either integrally joined with the element 112 or one element of a belt type wrench. In the latter instance, at least one longitudinal groove 154 is fashioned within the base of the wrench and serves to operably engage with one of the longitudinal ridges 128 of the female member 112. The wrench is operably held in place by a belt 156 which extends about the element 112 and selectively attaches to the wrench as at 158 by a snap or other attachment element. Accordingly, in this embodiment the wrench may be used repeatedly to tighten a plurality of void spacer units and then removed upon completion of a securement operation.

Method of Stabilizing Cargo

In operation, cargo to be secured is loaded into a ship's hold, truck trailer, boxcar, container, or the like and extensible load stabilizers are delivered to a container site. Load stabilizers 30 are provided having a first tubular member 40 or 110 having a base and a second tubular member 80 or 112 having a second base. The first 40 or 110 and second 80 or 112 tubular members may have external threads 48 and 120 and internal threads 90 and 126, being operable to engage each other and allow for the selective translation and extension of one tube with respect to the other. In a preferred embodiment, one or both of the first 40 or 112 or second 80 or 112 tubular members has an exterior surface operable for receiving rotational force applied to the exterior of the tubular members. In one embodiment, the exterior surface may consist of an enlarged peripheral collar 50 and 64 with longitudinally extending raised spines or ribs 52, 92, 122, and 128. In alternative embodiments, the exterior surface may comprise areas molded to fit a standard hexagonal wrench 164 or a torque tensioning member 150 as described above.

The load stabilizers 30 are positioned between a first surface and an opposing second surface within the transport container. One base is positioned relative to a surface of cargo to be stabilized and the other base is positioned relative to an opposing surface within the transport container such as another surface of cargo or an internal wall of the transport container. The first 40 and 110 and second 80 and 112 tubular members are extended with respect to each other between the opposing surfaces and stabilize the cargo against the opposing surface within the transport container.

SUMMARY OF MAJOR ADVANTAGES OF THE INVENTION

The subject invention provides a unique method and apparatus for stabilizing and enhancing resistance to shifting of cargo within transport containers which is convenient and easy to install preferably by hand and in any event merely with light-weight tools such as a belt wrench.

The invention also provides an entirely self-contained cargo stabilization system with extensible tubes between opposing bases that operably distributed loads.

This invention further provides a method and apparatus for stabilizing cargo having enhanced compression strength so that a load is securely restrained during transport but upon arrival at the destination, it may be quickly removed and disposed of or stored for re-use.

Another significant advantage of the subject invention is ability to customize the length of the cargo stabilizer to varying spaces between cargo in a transport load.

A further advantage of the subject invention is the ability to withstand the substantial force generated by restraining the transport of heavy cargo by distributing the load across a first column abutment panel and then a larger load abutment base panel.

The strengthening ribs advantageously provide not only structural rigidity for the columns but strengthen the flanges against bending and breakage. Moreover, the strengthening ribs provide a means for securely gripping the cylinder to facilitate securement.

The subject void fillers are inexpensive to manufacture, rugged in operation and easily adoptable to varying size and shaped loads.

In describing the invention, reference has been made to preferred embodiments. Those skilled in the art, however, and familiar with the disclosure of the subject invention, may recognize additions, deletions, substitutions, modifications and/or other changes which will fall within the purview of the invention as defined in the following claims.

What is claimed is:

1. An apparatus for stabilizing cargo within a transport container, said apparatus comprising:
  a first tubular member having
    a generally cylindrical body having a first end and a second end,
    a first base connected to said first end of said first tubular member, and
    external threads fashioned on said second end of said first tubular member; and
  a second tubular member having
    a generally cylindrical body having a first end and a second end,
    a second base connected to said first end of said second tubular member, and
    internal threads fashioned within the interior of said second end of said second tubular member, said internal threads being operable to receive said external threads of said first tubular member for relative axial translation of said first tubular member with respect to said second tubular member;

one of said first and said second bases being operable to react against a surface of cargo to be stabilized;

the other of said first and said second bases being operable to react against an opposing surface within the transport container;

a plurality of longitudinally extending raised strengthening ridges integral with the exterior surface of said first tubular member and abutting against said first base connected to said first tubular member; and a plurality of longitudinally extending raised strengthening ridges integral with the exterior surface of said second tubular member and abutting against said second base connected to said second tubular member, wherein said apparatus is operable stabilize the cargo by extending and filling a space between opposing surfaces of at least one of cargo and cargo and cargo and a surface of a transport container.

2. An apparatus for stabilizing cargo within a transport container as defined in claim 1, and further comprising:

an adhesive element extending across substantially an entire outer surface of one of said first or said second bases, said adhesive element being operable to locate and prevent rotation of said one of said first or said second bases carrying said adhesive element.

3. An apparatus for stabilizing cargo within a transport container as defined in claim 1 wherein:

each of said longitudinally extending raised strengthening ridges of said first tubular member and said second tubular member are substantially rectangular in cross section.

4. An apparatus for stabilizing cargo within a transport container as defined in claim 3 wherein:

said longitudinally extending raised strengthening ridges of said first tubular member are integral with said first base connected to said first tubular member; and said longitudinally extending raised strengthening ridges of said second tubular member are integral with said second base connected to said second tubular member.

\* \* \* \* \*